Patented July 11, 1933

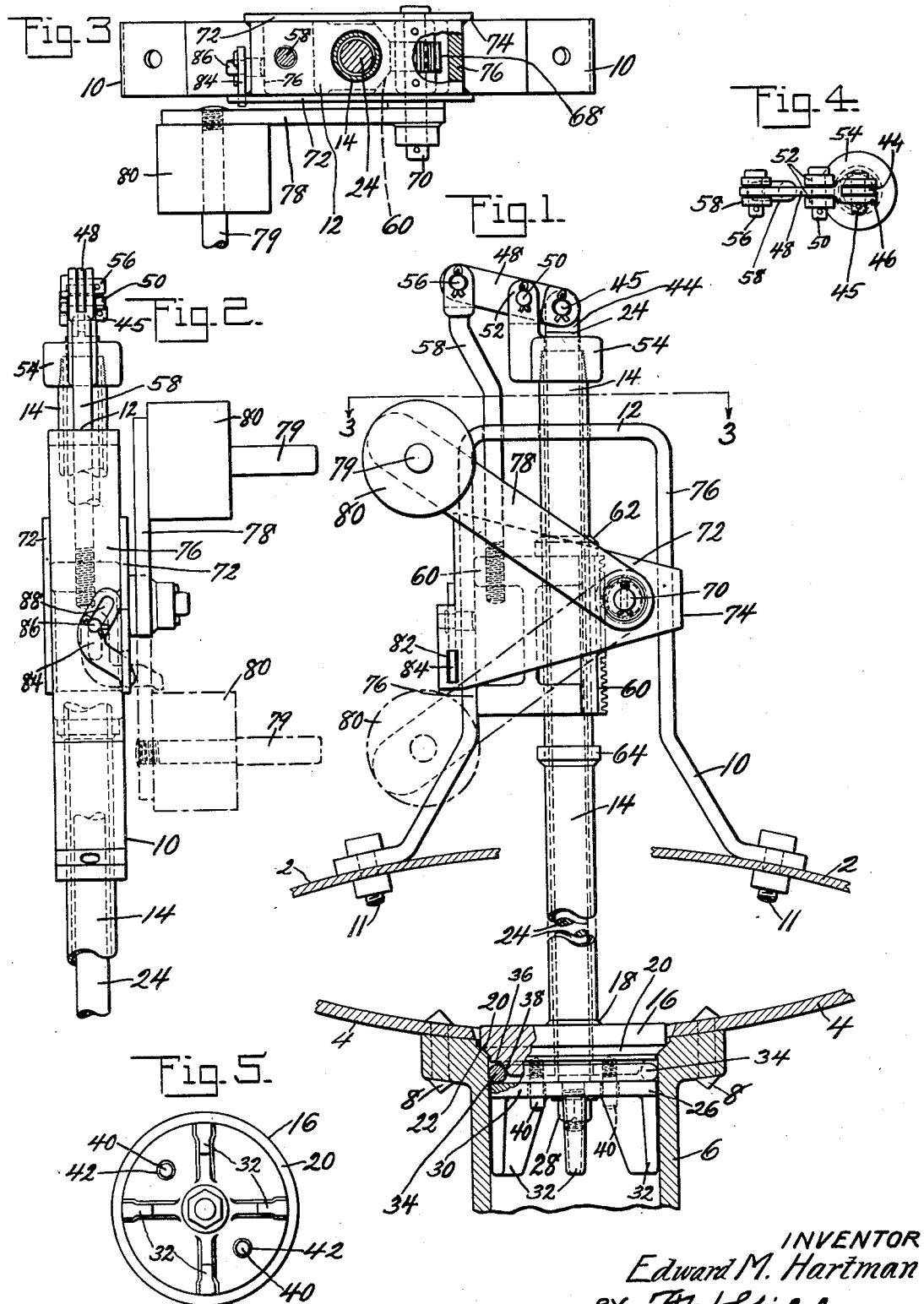

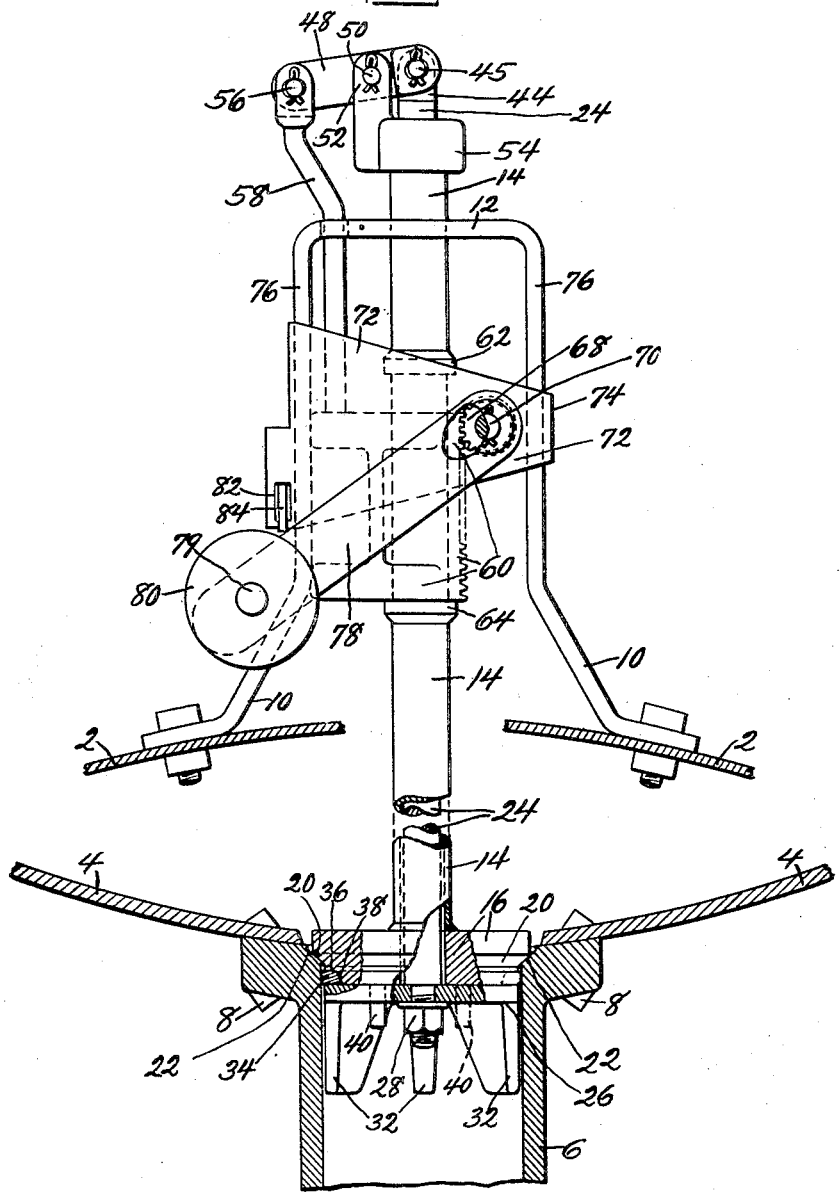

1,918,184

UNITED STATES PATENT OFFICE

EDWARD M. HARTMAN, OF MILTON, PENNSYLVANIA, ASSIGNOR TO AMERICAN CAR AND FOUNDRY COMPANY, OF NEW YORK, N. Y., A CORPORATION OF NEW JERSEY

VALVE AND OPERATING MEANS THEREFOR

Application filed February 12, 1932. Serial No. 592,485.

This invention relates generally to valves and is directed to valves adapted particularly for use with car tanks, though the construction is not limited to such use as it is applicable to containers generally for the purpose of controlling discharge of lading through a suitable outlet.

One object of this invention is the provision of a new and improved valve.

Another object of this invention is the provision of a multi-part valve and operating means therefor.

Still another object of this invention is the provision of a valve having provision for sealing a discharge outlet against leakage especially in the event of improper seating of the valve, the latter being formed of a plurality of parts, and the invention also embodying a new and improved operating means for the valve.

A further object of this invention is the provision of a valve for controlling flow through a discharge outlet, and operating means for the valve; the valve being formed of independently movable parts and having a gasket interposed therebetween adapted to seal the discharge outlet against leakage and the operating means for the valve having provision for independently moving one of said parts relative to the other, and also having means for simultaneously shifting the parts of the valve relative to the discharge outlet.

Other objects and advantages of this invention will be apparent from the following description taken in conjunction with the accompanying drawings in which:

Figure 1 is a front view of the device showing the same applied to a car tank, portions only of the latter being shown, certain parts being shown in section;

Fig. 2 is an end elevation of the operating means for the valve;

Fig. 3 is a sectional view on the line 3—3, Fig. 1;

Fig. 4 is a top plan view of a portion of the operating means of the valve, the view showing particularly the lever arrangement;

Fig. 5 is an inverted plan view of the valve guide, and

Fig. 6 is a front elevation of the device applied to a car tank, the valve being shown in seated position on the discharge outlet; certain parts in the figure being shown in section and other parts being broken away.

In the drawings, the top and bottom portions of a car tank are shown at 2 and 4 respectively, the latter having a discharge outlet 6 secured thereto by suitable fasteners 8. The top portion of the tank serves as a support for a bracket 10 of substantially inverted and flanged U-shape secured to the top portion by suitable fasteners such as the bolts 11, and the cross bar 12 of the bracket serves as a guide for a tubular valve rod 14 secured at its lower end to a valve body 16 in any suitable manner as by being welded to the body at 18. The portion 2 of the tank which supports the bracket 10 may be within a tank dome whereby the operating means for the valve may be concealed or covered by the usual dome cover. The valve body 16 is provided with a beveled seating surface 20 which is adapted to rest on a valve seat 22 formed, in the instance shown, at the upper end of the discharge outlet. Obviously, if desired, an independent valve seat may be provided within the scope of the present invention.

The valve rod 14 projects beyond the crossbar 12 and retains therein a supporting element 24 for a valve guide 26, the supporting element being preferably a rod which extends through the valve body and through the valve guide and is provided at its lower end with a supporting nut 28 on which the valve guide 26 rests. As shown clearly in the drawings, the valve guide 26 is positioned within the discharge outlet 6 and comprises a disc 30 having radially arranged wings 32 on its under surface. The disc 30 supports a compressible gasket 34 adapted to be compressed between the valve body and guide into sealing relation with the discharge outlet 6 upon movement of the valve guide 26 in the direction of opening movement of the valve body 16. This sealing relation of the gasket 34 is clearly shown in Fig. 6 and the means for effecting the movement just described will be hereinafter pointed out. To provide for compression of the gasket 34 the lower surface of the valve body is reduced in diameter to form an annular recess defined by the angularly arranged shoulders 36 and 38 respectively. While the guide 26 is capable of longitudinal movement relative to the valve body 16 it is restrained against rotation relative to the valve body 16 by means of pins 40 which project into apertures 42 formed in the valve guide.

The rod 24 projects beyond the upper end of the valve rod 14 and its upper end portion is formed into an ear 44 to which is pivoted at 45 the bifurcated end 46 of a lever 48 mounted on a fulcrum pin 50 in the ears 52 of a bracket 54 secured to the upper end of the valve rod 14. As clearly shown in Figs 1 and 6, the fulcrum for lever 48 is more closely adjacent the pivot mounting 45 than the opposite end of the lever 48, and said opposite end is pivoted at 56 to the upper end of a post 58 which extends through the cross-bar 12 of bracket 10 and is connected at its lower end to a rack 60 slidably mounted on the valve rod 14 for movement between upper and lower collars 62 and 64 respectively. In constant mesh with the rack 60 is a pinion 68 mounted on a pin 70 supported by the spaced walls 72 of a yoke 74 secured in any suitable manner to the side arms 76 of the bracket 10. As will be apparent from Fig. 3, the rack 60 is of such form as to be guided in its movement by the side walls 72 of the yoke 74.

A hand lever 78 is connected to the pin 70 and is provided at its free end with a handle 79 carrying a weight 80 which normally retains the lever in lowered position as shown in full lines in Fig. 6, which discloses the valve in seated position closing the discharge outlet 6. Means are also provided for preventing accidental upward movement of the lever 78 and, as clearly shown in Figs. 1 and 3, one of the side walls 72 of the yoke 74 is projected rearwardly beyond the adjacent side arms 76 of the bracket and is provided with a longitudinal slot 82, the lower end of which normally supports a latch 84, the free end of which is adapted to overlie the lever 78. The latch 84 is mounted on a pin 86 secured to the side arm 76 of the bracket 10 and is generally of angle shape in plan and is provided with a slot 88 through which the pin 86 extends. To free the lever for movement, the latch is shifted on the pin 86 to the position shown in full lines in Fig. 2 whereby the free end of the latch is clear of the lever.

In operation, assuming the parts to be arranged as shown in Fig. 1, where the valve body 16 rests on its seat 22 but the gasket 34 is not under compression in the discharge outlet, operation of the lever 78 from the full line position to the dotted line position shown in this figure will cause the rack 60 to move downwardly on the valve rod 14 until the lower end thereof contacts with the collar 64 to firmly set the valve body 16 on its seat 22. This downward movement of the rack 60 also causes the post 58 to be lowered, which swings the lever 48 on its fulcrum 50 to lift the rod 24 and thus cause the valve guide 26 to exert pressure against the gasket 34 in a direction opposite the direction of closing movement of the valve body 16 to compress the gasket 34 between the valve body 16 and guide 26 into sealing relation with the outlet 6 such as shown in Fig. 6.

When it is desired to discharge the lading from the tank through the outlet 6, the lever 78 is moved upwardly from the position shown in Fig. 6, this upward swinging of the lever causing lifting of the rack 60. It will be apparent that immediately upon commencement of swinging movement of the lever 78 the rack 60 causes the post 58 to actuate the lever 48 on its fulcrum 50 to cause downward movement of the rod 24 which will effect a lowering of the valve guide 26 to relieve the gasket 34 of compression and thus break the seal established by the gasket. Continuation of the movement of the lever 78 causes the upper end of the rack 60 to engage the upper collar 62 on the valve rod 14 to lift the valve rod and the valve body 16, the latter leaving its seat 22 as will be obvious. Due to the fact that the bracket 54 is secured to the valve rod 14, it will be apparent that the before mentioned continuation of upward movement of the valve rod 14 causes an elevation of the rod 24 and the valve guide 26. The lever 78 may be swung from one side of a vertical plane coincident with the longitudinal axis of the pin 70 to the opposite side of said plane but upward movement of the valve rod 14 is obviously limited by means of the collar 62 engaging the lower surface of the cross-bar 12; the cross-bar 12 thus serving as a stop.

From the above description it is believed that the construction and operation of the present invention will be fully apparent to those skilled in the art. The drawings herein illustrate one embodiment of the invention but it is to be understood that they are for illustrative purpose only and various changes in the form and proportions of the construction may be made within the scope of the appended claims without departing from the spirit of the invention.

What is claimed is:

1. In combination with a car tank, a multi-part valve for controlling flow through a discharge outlet, and means for actuating said valve comprising a tubular member connected to one of the valve parts, a rod connected to the other valve part, means connecting said tubular member and rod, and means for shifting said tubular member and rod to shift the multi-part valve as a unit, said means having provision for actuating one of said valve parts relative to the other during a portion of its movement.

2. In combination with a car tank, a multi-part valve for controlling flow through a discharge outlet, and means for actuating said valve comprising a tubular member connected to one of the valve parts, a rod connected to the other valve part, a lever supported by the tubular member and connected to the rod, and means having a lost motion connection with said tubular member and operative to shift the latter and said rod to effect shifting of said valve as a unit, said means being connected with the lever to operate the latter during a portion of the movement of said means to cause operation of one of the valve parts relative to the other.

3. In a valve, a valve body for closing a discharge outlet, a valve rod for actuating the valve body, a valve guide in the discharge outlet, a gasket interposed between said valve body and valve guide, a supporting element for the valve guide having movement independently of said valve rod, and a lever pivotally connected to the valve rod and supporting element and operative to shift the latter relative to the valve rod whereby to shift the valve guide to compress the gasket between the valve body and valve guide into sealing relation with the discharge outlet.

4. In combination with a valve body for closing a discharge outlet, a valve rod for shifting the valve body, and means for actuating the valve rod, a valve guide in the discharge outlet, and supporting means for the valve guide including a lever connected with the valve rod actuating means and operable by and during a portion of the movement of the latter for shifting the valve guide relative to the valve body.

5. In combination with a valve body for closing a discharge outlet, a valve rod for shifting the valve body, and means for actuating the valve rod, a valve guide in the discharge outlet, a gasket interposed between the valve body and valve guide, and supporting means for the valve guide including a lever connected with the valve rod actuating means and operable by and during a portion of the movement thereof for shifting the valve guide relative to the valve body to compress the gasket into sealing relation with the discharge outlet and to relieve the gasket of compression dependent upon the direction of movement of the valve rod actuating means.

6. In a valve, a valve body for closing a discharge outlet, a valve rod connected to the valve body, a valve guide in the discharge outlet, a valve guide supporting element, a lever connected to the valve rod and to which said guide supporting element is pivotally connected, and means for shifting the valve rod to actuate the valve body, said means having a connection with the before mentioned lever and being operative to shift the lever to effect an exertion of pressure against the valve guide in a direction opposite the direction of closing movement of the valve body to compress the gasket into sealing relation with the discharge outlet.

7. In a valve, a valve body shiftable into closed and open position relative to a discharge outlet, a valve rod connected to the valve body, a valve guide in the discharge outlet, a gasket interposed between the valve body and valve guide, a rod connected to the valve guide, a lever to which said rod is pivoted, a lever support on the valve rod to which the lever is pivotally connected and actuating means for the valve rod having lost motion connection therewith and also having a connection with said lever, said actuating means being operative in one direction to first shift the lever on its pivot to effect movement of the valve guide relative to the valve body and then a removal of the valve body from its seat.

8. In a valve, a valve body shiftable into closed and open position relative to a discharge outlet, a valve rod connected to the valve body, a valve guide in the discharge outlet, a gasket interposed between the valve body and valve guide, a rod connected to the valve guide, a lever to which said rod is pivoted, a lever support on the valve rod to which the lever is pivotally connected and actuating means for the valve rod having lost motion connection therewith and also having a connection with said lever, said actuating means being operative in one direction to first shift the lever on its pivot to effect movement of the valve guide relative to the valve body in a direction opposite the direction of opening movement of the valve and then a shifting of the valve body and valve guide in the direction of opening movement of the valve body.

9. In a valve, a valve body for closing a discharge outlet, a valve rod connected to the body, a valve guide in the discharge outlet, a gasket interposed between the valve body and valve guide, supporting means for the valve guide including a lever pivotally connected to the valve rod, and lever actuated means on the valve rod for shifting the latter to seat and unseat the valve body, said means being connected to the before mentioned lever and being so arranged on the valve rod as to be capable of movement after the valve body is seated to shift the lever to cause an exertion of pressure against the valve guide in a direction opposite the direction of closing movement of the valve body to compress the gasket into sealing relation with the discharge outlet.

10. In a valve, a valve body for closing a discharge outlet, a valve rod, a valve guide in the discharge outlet, a gasket interposed between the valve body and valve guide, means shiftable on the valve rod and operable to move the latter and the valve body to seat and unseat said valve body, and lever operated means supporting said valve guide and connected to the before mentioned shiftable means, said lever operated means being operative by the shiftable means subsequent to seating of the valve body to actuate the valve guide relative to said valve body to compress the gasket into sealing relation with the discharge outlet.

11. In a valve, a valve body for closing a discharge outlet, a valve rod for actuating the valve body, a valve guide in the discharge outlet, a gasket interposed between the valve body and valve guide, lever actuated means on the valve rod for shifting the valve rod to seat and unseat the valve, said means having lost motion connection with the valve rod, and means for exerting pressure against the valve guide to compress the gasket into sealing relation with the discharge outlet comprising a rod supporting the valve guide, a lever pivotally supported by the valve rod and connected with the guide supporting rod and lever actuated means, said lever being operable by the lever actuated means during movement thereof subsequent to seating of the valve body.

12. In a valve, a valve body for closing a discharge outlet, a tubular valve rod, a valve guide in the discharge outlet, a gasket interposed between said valve body and valve guide, a supporting element for the valve guide arranged within the valve rod, lever actuated means on the valve rod for shifting the latter, said means having lost motion connection with the valve rod, a lever having its ends connected respectively to the lever actuated means and valve guide supporting element, and a fulcrum support for the lever secured to the lever actuated means.

13. In a valve, a valve body for closing a discharge outlet, a tubular valve rod, a valve guide in the discharge outlet, a gasket interposed between said valve body and valve guide, a supporting element for the valve guide arranged within the valve rod, lever actuated means on the valve rod for shifting the latter, said means having lost motion connection with the valve rod, a lever having its ends connected respectively to the lever actuated means and valve guide supporting element, and a fulcrum support for the lever secured to the lever actuated means, said lever actuated means being operable in one direction to first cause seating of the valve body and then pivotal movement of the lever to effect shifting of the valve guide relative to the valve body to compress the gasket into sealing relation with the discharge outlet and said lever actuated means being operable in the opposite direction to first actuate the lever to shift the valve guide to relieve the gasket of compression, continued movement of the lever actuated means effecting shifting of the valve body and valve guide relative to the discharge outlet to unseat the valve.

14. In a valve, a valve body for closing a discharge outlet, a valve rod connected to the body, a valve guide in the discharge outlet, a gasket interposed between the valve body and valve guide, lever actuated means having lost motion connection with the valve rod and operative for shifting the valve body and valve guide as a unit relative to the discharge outlet, and lever means connected to the lever actuated means for operation thereby and having a connection with the valve guide, said lever means being operative during a portion of the movement of said lever actuated means to effect relative movement of the valve body and valve guide to compress the gasket into sealing relation with the discharge outlet.

15. In a valve, a valve body for closing a discharge outlet, a valve rod connected to the body, a valve guide in the discharge outlet, a gasket interposed between the valve body and valve guide, lever actuated means having lost motion connection with the valve rod and operative for shifting the valve body and valve guide as a unit relative to the discharge outlet, and lever means connected to the lever actuated means for operation thereby and having a connection with the valve guide, said lever means being operative by and during a portion of the movement of said lever actuated means in one direction to effect relative movement of the valve body and valve guide to compress the gasket into sealing relation with the discharge outlet and in the opposite direction to relieve the gasket of compression.

16. In a valve, a valve body for closing a discharge outlet, a valve rod secured to the valve body, a valve guide in the discharge outlet, supporting means for the valve guide including a lever pivotally connected to the valve rod, spaced collars on the valve rod, lever actuated means on the valve rod for actuating the latter, said means being shiftable between and into contact with said collars, and means connecting said lever with the lever actuating means, the latter being operative when the valve body is in seated position to operate the lever to effect shifting of the valve guide relative to the valve body prior to unseating of the valve body.

17. In a valve, a valve body for closing a discharge outlet, a valve rod connected to the valve body, a bracket in which the valve rod is guided, a yoke secured to the bracket, a rack slidably mounted on the valve rod and guided in its movement by said yoke, a pinion supported by the yoke and operable to shift the rack, upper and lower collars on the the valve rod with which the rack is adapted to engage during movement thereof to respectively lift the valve rod and to retain the valve body against shifting, a valve guide in the discharge outlet, and supporting means for the valve guide including a lever connected with the sleeve and adapted to be operated thereby during a portion of the movement of said sleeve to shift the valve guide relative to the valve body.

18. In combination with a car tank, a multi-part valve for controlling flow through a discharge outlet, and means for actuating said valve comprising a tubular member connected to one of the valve parts, a rod connected to the other valve part, means connected to the tubular member for supporting said rod, and means shiftable on the tubular member for actuating the latter to seat and unseat the valve, said shiftable means having provision for moving the supporting means for the rod to actuate one of the valve parts relative to the other during a portion of its movement.

In witness whereof I have hereunto set my hand.

EDWARD M. HARTMAN.